US012680368B2

(12) United States Patent
Dreyer et al.

(10) Patent No.: US 12,680,368 B2
(45) Date of Patent: Jul. 14, 2026

(54) DETECTOR MODULE FOR USE IN AN ENTRANCE SYSTEM

(71) Applicant: Assa Abloy Entrance Systems AB, Landskrona (SE)

(72) Inventors: Roger Dreyer, Bjarred (SE); Stefan Paulsson, Odakra (SE)

(73) Assignee: Assa Abloy Entrance Systems AB, Landskrona (SE)

( * ) Notice: Subject to any disclaimer, the term of this patent is extended or adjusted under 35 U.S.C. 154(b) by 127 days.

(21) Appl. No.: 18/710,484

(22) PCT Filed: Nov. 22, 2022

(86) PCT No.: PCT/EP2022/082701
§ 371 (c)(1),
(2) Date: May 15, 2024

(87) PCT Pub. No.: WO2023/094340
PCT Pub. Date: Jun. 1, 2023

(65) Prior Publication Data
US 2025/0012131 A1    Jan. 9, 2025

(30) Foreign Application Priority Data
Nov. 23, 2021    (SE) .................................... 2130321-9

(51) Int. Cl.
*E05F 15/73*         (2015.01)
*G01V 8/20*         (2006.01)
G06V 20/52        (2022.01)
(52) U.S. Cl.
CPC ................ *E05F 15/73* (2015.01); *G01V 8/20* (2013.01); *E05F 2015/765* (2015.01);
(Continued)

(58) Field of Classification Search
CPC ................ E05F 15/73; E05F 2015/765; E05F 2015/767; G01V 8/20; G06V 20/52; E05Y 2400/44; E05Y 2400/66; E05Y 2900/132
See application file for complete search history.

(56) References Cited

U.S. PATENT DOCUMENTS 11,153,945 B1    10/2021    Feil
12,421,782 B2 *   9/2025    Soderqvist .............. E05F 15/70
(Continued)

FOREIGN PATENT DOCUMENTS

CN       105355084       2/2016
EP        2266911       12/2010
(Continued)

OTHER PUBLICATIONS

International Search Report for PCT/EP2022/082701, completed Feb. 23, 2023.
(Continued)

*Primary Examiner* — Kevin K Pyo
(74) *Attorney, Agent, or Firm* — Wissing Miller LLP

(57) ABSTRACT
A detector module (20) for use in an entrance system (100) comprises one or more light-emitting units (30*a-n*) being configured to provide status information related to the entrance system (100). The detector module (20) is configured to detect at least one change in said status information provided by the one or more light-emitting units (30*a-n*). The detector module (20) is further configured to, in response to said at least one change being detected, wirelessly communicate said at least one change to a remote server unit (40).

16 Claims, 7 Drawing Sheets

(52) U.S. Cl.
CPC ..... *E05F 2015/767* (2015.01); *E05Y 2400/44*
(2013.01); *E05Y 2400/66* (2013.01); *E05Y*
*2900/132* (2013.01); *G06V 20/52* (2022.01);
*G06V 2201/02* (2022.01)

(56) References Cited

U.S. PATENT DOCUMENTS

| | | |
|---|---|---|
| 2003/0093951 A1 | 5/2003 | Ikeuchi |
| 2014/0006823 A1 | 1/2014 | Lamb |
| 2015/0102928 A1 | 4/2015 | Sirotkin |
| 2019/0284864 A1* | 9/2019 | Dreyer .................... E05F 15/73 |
| 2020/0355014 A1 | 11/2020 | Gregoriou |

FOREIGN PATENT DOCUMENTS

| | | |
|---|---|---|
| EP | 2418517 | 2/2012 |
| JP | 2017014719 | 1/2017 |
| WO | 2018025815 | 2/2018 |

OTHER PUBLICATIONS

Swedish Search Report for SE Application No. 2130321-9, completed Jul. 7, 2022.

* cited by examiner

20

28

26

22

27

30

20

24

STATUS

32

30

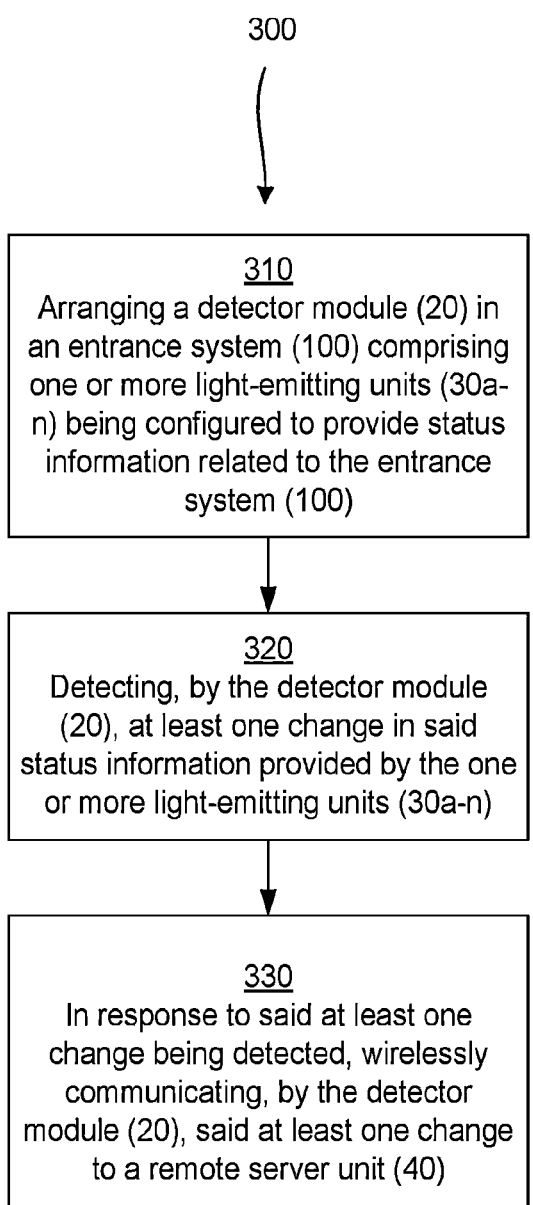

300

310
Arranging a detector module (20) in an entrance system (100) comprising one or more light-emitting units (30a-n) being configured to provide status information related to the entrance system (100)

320
Detecting, by the detector module (20), at least one change in said status information provided by the one or more light-emitting units (30a-n)

330
In response to said at least one change being detected, wirelessly communicating, by the detector module (20), said at least one change to a remote server unit (40)

Fig 10

DETECTOR MODULE FOR USE IN AN ENTRANCE SYSTEM

This application is a 371 of PCT/EP2022/082701, filed on Nov. 22, 2022, published on Jun. 1, 2023, under publication number WO 2023/094340, which claims priority benefits from Swedish Patent Application No. 2130321-9, filed on Nov. 23, 2021, the disclosure of each of which are incorporated herein by reference.

TECHNICAL FIELD

The present invention generally relates to entrance systems. More specifically, the present invention relates to a detector module for use in an entrance system. The present invention also relates to an associated detector module system and a method.

BACKGROUND

Entrance systems are frequently used in both private and public areas and are operating during long periods and under various conditions in terms of time of day, time of week, time of year, passage frequencies, etc. Automatic door operators are typically used for controlling an electric motor to open and close door members of the entrance system. The opening and closing procedures are performed so that entrance and exit to buildings, rooms, and other areas are facilitated.

Entrance systems are often equipped with a variety of light-emitting units, e.g. semiconductor light sources such as diodes or other types of similar electronic components being capable of emitting light upon being influenced by electric currents. Light-emitting units are used for different purposes in terms of providing a variety of status information related to the entrance systems. Light-emitting units can for instance be used to provide status information including movements of humans or vehicles in the vicinity of the entrance systems, alarm indications, collision detections for avoiding collisions between objects and door members, operational status of door members and other electronic or mechanical components, traffic information of vehicles or humans passing through the entrance systems, timer statuses, external conditions, such as weather conditions, error messages, and much more. The status information provided by the light-emitting units is typically transmitted to and handled by a controller associated with the automatic door operator.

There exist numerous problems in the prior art regarding compatibility of different entrance systems and the managing of status information. In particular, there are no satisfactory solutions for solving the problem of how to retrieve status information from entrance systems without accessing and modifying internal components of the controllers associated with the entrance system. This is even more problematic in cases where entrance systems are produced by different manufacturers having different controller configurations.

Light-emitting units arranged in an entrance system are in the prior art typically coupled with the associated controller in the automatic door operator by means of wired electrical connections. When the light-emitting units are providing status information related to the entrance system, the provided status information is subsequently transmitted via the wired electrical connections to the controller. The controller interprets the information and manages further control or indicates any change in status information accordingly. A skilled technician is normally required for the proper setup and mounting of light-emitting units in the entrance system. Arranging the light-emitting units and their electrical wired connections can be a time-consuming and complex process even for the skilled technician, particularly in a large entrance system having a plurality of door members and a plurality of light-emitting units for each door member.

The simple light-emitting units are not capable of wirelessly communicating. It is therefore not possible to use the simple light-emitting units for wirelessly communicating the status information.

Some entrance systems known in the art employ more complex light-emitting units comprising wireless communication functionalities. It is however desired to use as simple types of light-emitting units as possible for providing the variety of status information as described in the background section. Reasons for this are e.g. related to lower costs, smaller sizes, and relatively easier installations compared to more complex light-emitting units.

Even in cases where more complex light-emitting units comprising wireless communication functionalities are employed, the light-emitting units are still configured to be operable with the controller of the associated entrance system. Accordingly, prior art systems employing more expensive types of light-emitting units comprising wireless communication functionalities still do not solve the problem of versatile management of status information without requiring access to and modifications of internal components of the controllers associated with the entrance system.

The present inventor has identified the above mentioned drawbacks in the prior art and insightfully discovered a solution of managing status information provided by light-emitting units in entrance systems in a versatile and universally applicable manner.

SUMMARY

An object of the present disclosure is therefore to provide a detector module, an entrance system, a detector module system, and a method, which seek to mitigate, alleviate, or eliminate one or more of the above-identified deficiencies in the art and disadvantages singly or in any combination.

In a first aspect, a detector module for use in an entrance system comprising one or more light-emitting units being configured to provide status information related to the entrance system is provided. The detector module is configured to detect at least one change in said status information provided by the one or more light-emitting units, and in response to said at least one change being detected, wirelessly communicate said at least one change to a remote server unit.

By arranging the detector module in the entrance system to detect changes in the status information, the light-emitting units need not themselves be connected to the controller nor comprise wireless communication functionalities. The detector module according to the first aspect can therefore effectively be used in entrance systems comprising the simplest types of light-emitting units as discussed above. The detector module is adapted to detect changes in the status information provided by the light-emitting units and communicate said detected changes to a remote server unit. Accordingly, the detector module is universally applicable such that it can manage status information provided by any light-emitting unit in any entrance system. Moreover, neither the light-emitting units nor the detector module need to be electrically wired to or wirelessly configured with the controller since the detector module comprises wireless communication functionalities for communicating the information to the remote server unit being widely accessible.

In light of the inventor's discoveries according to the first aspect, the detector module can effectively be retrofitted to any entrance system comprising any setup of door members and light-emitting units. This significantly increases the versatility in managing status information and at the same time reduces the complexity and time required to manage status information in entrance systems.

In one or more embodiments, the detector module comprises one or more optical detector units.

In one or more embodiments, each optical detector unit is arranged to detect at least one change in status information provided by a respective light-emitting unit.

In one or more embodiments, each optical detector unit is mounted to the respective light-emitting unit by means of an adhesive material.

In one or more embodiments, each optical detector unit comprises a housing having a light-emitting device, wherein said light-emitting device is indicative of said at least one change in status information provided by the respective light-emitting unit.

In one or more embodiments, the detector module comprises a camera unit being configured to read status information from a display associated with the one or more light-emitting units.

In one or more embodiments, the detector module is configured to process the status information read from the display by applying one or more image processing algorithms.

In one or more embodiments, said status information related to the entrance system is selected from a group comprising: presence detection status information, safety-related status information, door member status information, traffic status information, alarm status information, electrical component status information, timer status information, external condition status information, and error status information.

In one or more embodiments, the remote server unit is an IoT cloud unit, and the detector module is configured to wirelessly communicate to the IoT cloud unit via one or more short-range or long-range communication interfaces.

In one or more embodiments, said wirelessly communicated at least one change in status information is processed to control further operation of the entrance system and/or indicate a change in status information.

In one or more embodiments, the detector module is adapted to be removably arranged in the entrance system.

In one or more embodiments, the detector module is adapted to be retrofitably arranged to any entrance system comprising one or more light emitting units.

In a second aspect, an entrance system is provided. The entrance system comprises one or more light-emitting units being configured to provide status information related to the entrance system, and a detector module being configured to: detect at least one change in said status information provided by the one or more light-emitting units, and in response to said at least one change being detected, wirelessly communicate said at least one change to a remote server unit.

In one or more embodiments, the entrance system comprises one or more movable door members being sliding door members, revolving door members, swing door members, industrial vertical-lifting door members, overhead sectional door members, folding door members and/or any combination thereof.

In a third aspect, a detector module system is provided. The detector module system comprises a plurality of detector modules according to the first aspect or any embodiments being dependent thereon for use in an entrance system entrance system according to the second aspect or any embodiments being dependent thereon, wherein each detector module for use in the entrance system is configured to detect at least one change in status information provided by a subset of the one or more light-emitting units.

In a fourth aspect, a method is provided. The method comprises: arranging a detector module in an entrance system, the entrance system comprising one or more light-emitting units being configured to provide status information related to the entrance system: detecting, by the detector module, at least one change in said status information provided by the one or more light-emitting units; and in response to said at least one changed being detected, wirelessly communicating, by the detector module, said at least one change to a remote server unit.

It should be emphasized that the term "comprises/comprising" when used in this specification is taken to specify the presence of stated features, integers, steps, or components, but does not preclude the presence or addition of one or more other features, integers, steps, components, or groups thereof. All terms used in the claims are to be interpreted according to their ordinary meaning in the technical field, unless explicitly defined otherwise herein. All references to "a/an/the [element, device, component, means, step, etc.]" are to be interpreted openly as referring to at least one instance of the element, device, component, means, step, etc., unless explicitly stated otherwise. The steps of any method disclosed herein do not have to be performed in the exact order disclosed, unless explicitly stated.

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale; emphasis instead being placed upon illustrating the example embodiments.

FIG. 10 illustrates a schematic block diagram of a method according to one embodiment.

DETAILED DESCRIPTION OF EMBODIMENTS

Figure 1:
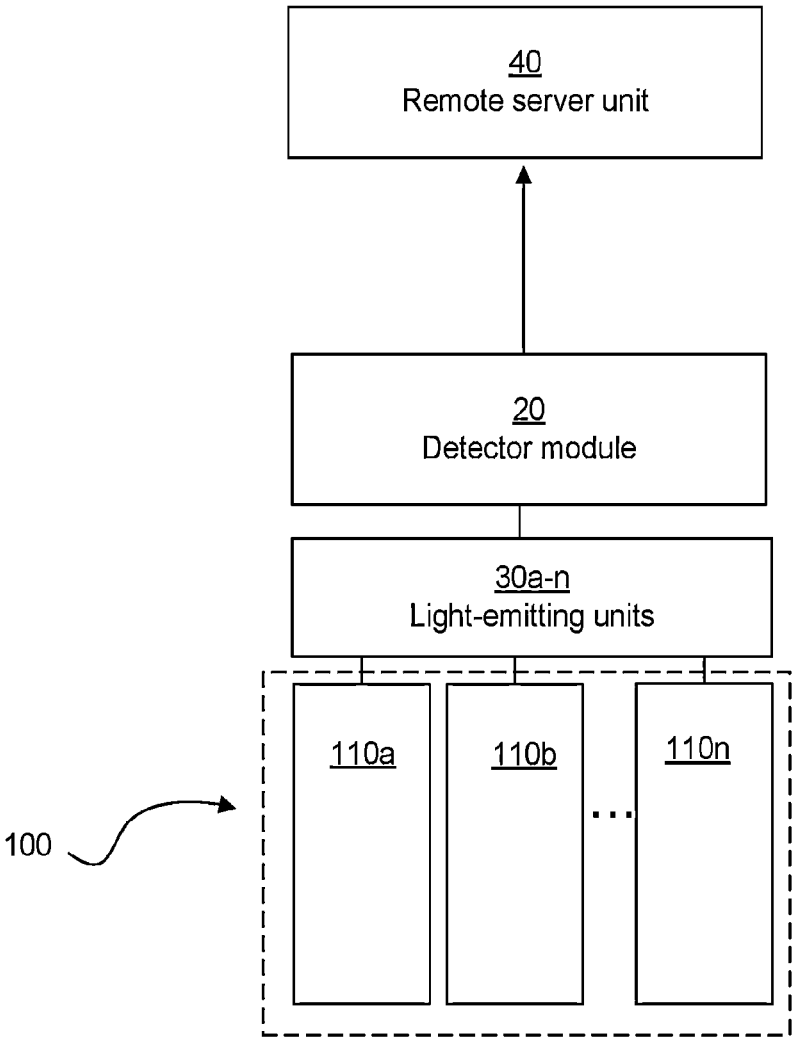
FIG. 1 is a schematic illustration of an entrance system comprising a detector module and a plurality of light-emitting units according to one embodiment.

Embodiments of the invention will now be described with reference to the accompanying drawings. The invention may, however, be embodied in many different forms and should not be construed as limited to the embodiments set forth herein; rather, these embodiments are provided so that this disclosure will be thorough and complete, and will fully convey the scope of the invention to those skilled in the art. The terminology used in the detailed description of the particular embodiments illustrated in the accompanying drawings is not intended to be limiting of the invention. In the drawings, like numbers refer to like elements.

With reference to FIG. 1, a schematic block diagram is shown which illustrates a detector module 20 to be used in an entrance system 100 according to one embodiment. The entrance system 100 comprises one or more light-emitting units 30*a-n*. The entrance system 100 may further comprise one or more movable door members 110*a-n*. The movable door members 110*a-n* may for instance be sliding door members, revolving door members, swing door members, industrial vertical-lifting door members, overhead sectional door members, folding door members and/or any combination thereof. The entrance system 100 may be designed for installation in a building to control access into the building from the outside of said building, or between different sections of the building.

The light-emitting units 30*a-n* may be any type of semiconductor light source capable of emitting light upon being influenced by electric currents, such as LEDs. The light-emitting units 30*a-n* may additionally, or alternatively, be associated with a display (not shown). The display can for instance be a screen or monitor capable of visualizing information. The light-emitting units 30*a-n* may be arranged practically anywhere in association with the entrance system 100 such that they are capable of providing status information related to the entrance system 100. For instance, the light-emitting units 30*a-n* can be mounted to any of the door members 110*a-n*, close to the door members 110*a-n* or at a particular distance from the door members 110*a-n*. The inventive concept as disclosed herein is not limited to a particular placement location of the light-emitting units 30*a-n*.

The light-emitting units 30*a-n* are configured to provide status information related to the entrance system 100. Status information related to the entrance system 100 may vary depending on different entrance system configurations.

In one embodiment, the status information related to the entrance system 100 comprises presence detection status information. The presence detection status information is indicative of a presence of an object, such as a human, animal or vehicle, approaching or being in the vicinity of the entrance system 100. The presence status detection information can involve information regarding a type of object, size of object, movement direction of object and/or distance to object being detected, and so forth.

In one embodiment, the status information related to the entrance system 100 comprises safety-related status information. The safety-related status information is indicative of any object, such as a human, animal or vehicle, being too close to a door member 110*a-n* or other components of the entrance system 100 such that there may be a risk of an accident. The safety-related status information can involve information regarding a type of object, size of object, movement direction of object and/or distance to object being detected, and so forth.

In one embodiment, the status information related to the entrance system 100 comprises door member status information. The door member status information is indicative of information related to the door members 110*a-n* of the entrance system 100 including e.g. how many door cycles have been performed, alignment of the door members 110*a-n*, performance of the door members 110*a-n*, and other operational information of the door members 110*a-n*.

In one embodiment, the status information related to the entrance system 100 comprises traffic status information. The traffic status information is indicative of information related to traffic passing through the entrance system 100 hourly, daily, weekly, etc. The traffic status information can involve a number of passing objects per time unit, a traffic congestion unit, a time between passing objects, and so forth.

In one embodiment, the status information related to the entrance system 100 comprises alarm status information. The alarm status information is indicative of alarms and associated timers of alarms in the entrance system 100.

In one embodiment, the status information related to the entrance system 100 comprises electrical component status information. The electrical component status information is indicative of operational status of electric components in the entrance system 100, such as e.g. if any electrical components are performing poorly or are malfunctioning.

In one embodiment, the status information related to the entrance system 100 comprises timer status information. The timer status information is indicative of any arbitrary timer in the entrance system 100, such as e.g. time between opening cycles of the door members 110*a-n* or start and stop timers of the door members 110*a-n*.

In one embodiment, the status information related to the entrance system 100 comprises external condition status information. The external condition status information is indicative of other external conditions somehow affecting the entrance system 100, such as weather conditions including wind velocity, precipitation, temperatures, dust, and so forth.

In one embodiment, the status information related to the entrance system 100 comprises error status information. The error status information is indicative of any errors in the entrance system 100 including error codes, source of error, suggested action to solve the error, and so forth.

The detector module 20 is configured to detect at least one change in the status information provided by the light-emitting units 30*a-n*. Changes in the status information indicate that current signals read by the light-emitting units 30*a-n* differ from the signals being previously read, i.e. that some change is occurring in the entrance system 100. Upon the at least one change being detected by the detector module 20, said at least one change is being wirelessly communicated to a remote server unit 40. The wireless communication preferably occurs with minimum delay, but the skilled person knows that some networking-related delays are inevitably expected.

The wirelessly communicated at least one change in status information is subsequently to be processed by the remote server unit 40. The processing may involve controlling further operation of the entrance system 100 and/or indicating the change in status information, for instance by signaling an operator's attention or performing some type of action. The processing, further operation and/or signaling depends on what type of change is occurring and what type of status information is affected.

In one embodiment, the remote server unit 40 is an IoT (Internet-of-Things) cloud unit, and the detector module 20 is configured to wirelessly communicate with the IoT cloud unit via one or more short-range or long-range communication interfaces. The IoT cloud unit may be implemented using any commonly known cloud-computing platform technologies, such as e.g. Amazon Web Services, Google Cloud Platform, Microsoft Azure, DigitalOcean, Oracle Cloud Infrastructure, IBM Bluemix or Alibaba Cloud. The IoT cloud unit may be included in a distributed cloud network that is widely and publically available, or alternatively limited to an enterprise. Alternatively, the IoT cloud unit may in some embodiments be locally managed as e.g. a centralized server unit. Storage means of the IoT cloud unit may be maintained by and/or configured as a cloud-based service being included with or external to the IoT cloud unit. Connection to cloud-based storage means may be established using DBaaS (Database-as-a-service). For instance, cloud-based storage means may be deployed as a SQL data model such as MySQL, PostgreSQL or Oracle RDBMS Alternatively, deployments based on NoSQL data models such as MongoDB, Amazon DynamoDB, Hadoop or Apache Cassandra may be used. DBaaS technologies are typically included as a service in the associated cloud-computing platform.

In alternative embodiments, the remote server unit 40 may be based on any type of client-server or peer-to-peer (P2P) architecture. Server configurations may thus involve any combination of e.g. web servers, database servers, email servers, web proxy servers, DNS servers, FTP servers, file servers or DHCP servers, to name a few.

The short-range or long-range communication interfaces may be any suitable IoT communication interface known in the art. Short-range communication interfaces include, for instance, IEEE 802.11, IEEE 802.15, ZigBee, WirelessHART, WiFi, Bluetooth®, BLE, RFID, WLAN, MQTT IoT, CoAP, DDS, NFC, AMQP, LoRaWAN, Z-Wave, Sigfox, Thread, EnOcean, mesh communication, or any other form of proximity-based device-to-device radio communication signal such as LTE Direct. Long-range communication interfaces include, for instance, W-CDMA/HSPA, GSM, UTRAN, LTE or Starlink.

Figure 2:
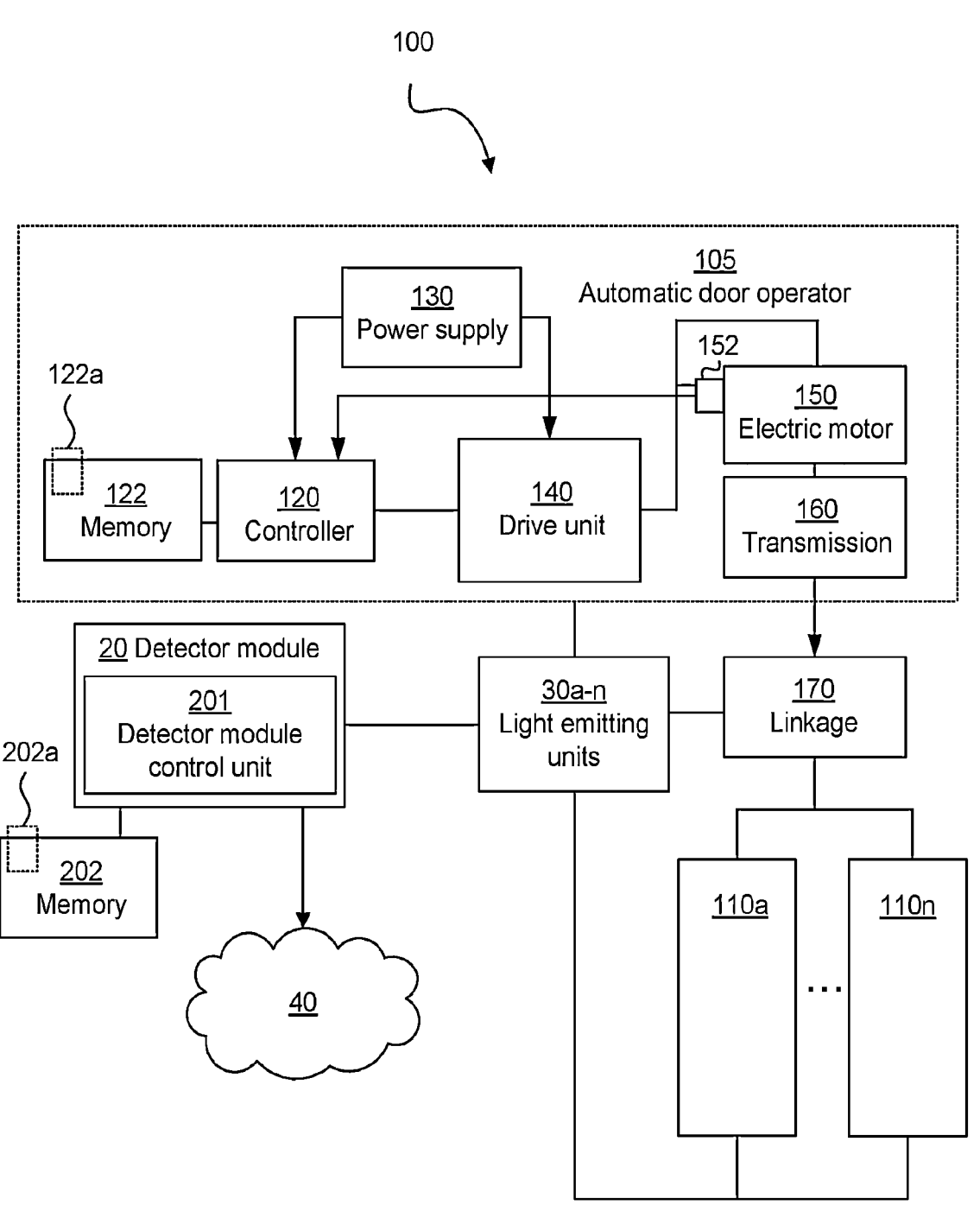
FIG. 2 is a schematic illustration of an entrance system comprising a detector module and a plurality of light-emitting units according to one embodiment.

With reference to FIG. 2, a more detailed view of an example of an entrance system 100 which the detector module 20 may be used in is given.

The entrance system 100 comprises an automatic door operator 105. The automatic door operator 105 is coupled to cause movement of the one or more movable door members 110*a-n* from at least a closed position in which passage through said entrance system 100 is prevented, to an open position in which passage is admitted. A linkage 170 is coupled with the door members 110*a-n* to take part in their opening and closing movement. The automatic door operator 105 further comprises a controller 120 having an associated memory 122 and program instructions 122*a* stored therein, a power supply 130, a drive unit 140, an electric motor 150, a revolution counter 152, and a transmission 160. The automatic door operator 105 is however not restricted to having these particular components, as other arrangements may be realized.

As shown in FIG. 2, the electric motor 150 is connected to the transmission 160. An output shaft (not shown) of the transmission 160 rotates upon activation of the electric motor 150 and is connected to the linkage 170. The linkage 170 translates the motion of the output shaft into a movement of the door members 110*a-n*. The power supply 130 is adapted to supply power to the drive unit 140, and preferably also to the controller 120 and other components of the automatic door operator 105. Alternative embodiments are however possible in which the controller 120 and other components of the automatic door operator 105 are powered by separate arrangements, such as an external power supply or battery, etc.

The controller 120 is configured for performing different functions of the automatic door operator 105. The controller 120 may be implemented in any known controller technology, including but not limited to microcontroller, processor (e.g. PLC, CPU, DSP), FPGA, ASIC or any other suitable digital and/or analog circuitry capable of performing the intended functionality. The memory 122 associated with the controller 120 may be implemented in any known memory technology, including but not limited to E(E)PROM, S(D) RAM or flash memory. In some embodiments, the memory 122 may be integrated with or internal to the controller 120. As seen at 122*a*, the memory 41 may store program instructions 122*a* for execution by the controller 120, as well as temporary and permanent data used by the controller 120. The revolution counter 152, such as an encoder or other angular sensor, is provided at the electric motor 150 to monitor the revolution of a motor shaft of the electric motor 150. The revolution counter 152 is connected to an input of the controller 120. The controller 120 is configured to use one or more readings of the revolution counter 152, typically a number of pulses generated as the motor shaft rotates, for determining a current angular position, e.g. angles of the door members 110*a-n* of the entrance system 100.

As further shown in FIG. 2, the light-emitting units 30*a-n* may also be arranged with the automatic door operator 105 or any components therein, or the linkage 170. Accordingly, the light-emitting units 30*a-n* may be capable of providing status information related to these components as well as the door members 110*a-n*.

As further shown in FIG. 2, the detector module 20 comprises a detector module control unit 201 with associated memory 202 and program instructions 202*a*. The detector module control unit 201, the memory 202 and the program instructions 202*a* may operate in conjunction with the detector module 20 similarly as described with reference to the controller 120 and its associated memory 122 and program instructions 122*a*. Accordingly, the detector module control unit 201 and memory 202 may be implemented in any known controller or memory technology, and the program instructions 202*a* may be stored similarly to the program instructions 122*a*. The detector module control unit 201, or alternatively any other logic unit comprised in the detector module 20, may be configured to wirelessly communicate with the remote server unit 40. The remote server unit 40 is in FIG. 2 depicted as an IoT cloud unit in accordance with the subject matter disclosed with reference to FIG. 1.

In one embodiment, the detector module 20 may be removably arranged in the entrance system 100. "Removably" is in this sense generally to be interpreted as "can be easily removed, inserted or replaced in the entrance system 100 without requiring installation in terms of pulling wires to, or configuring a setup with, the controller 120 associated with the entrance system 100". This enables advantageous retrofitting of the detector module 20 in the entrance system 100.

Figure 3:
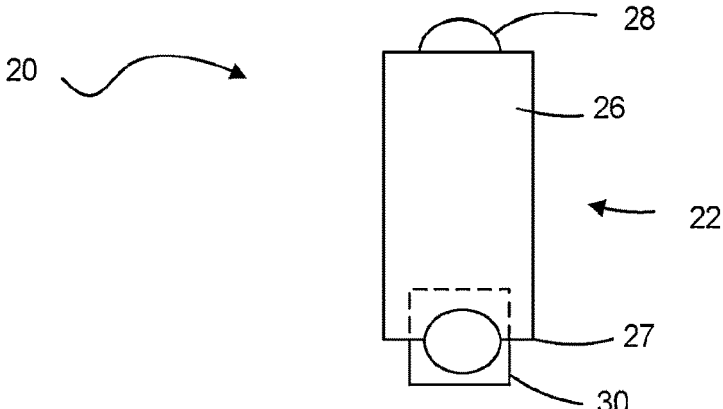
FIG. 3 is a schematic illustration of a detector module according to one embodiment.
Figure 4:
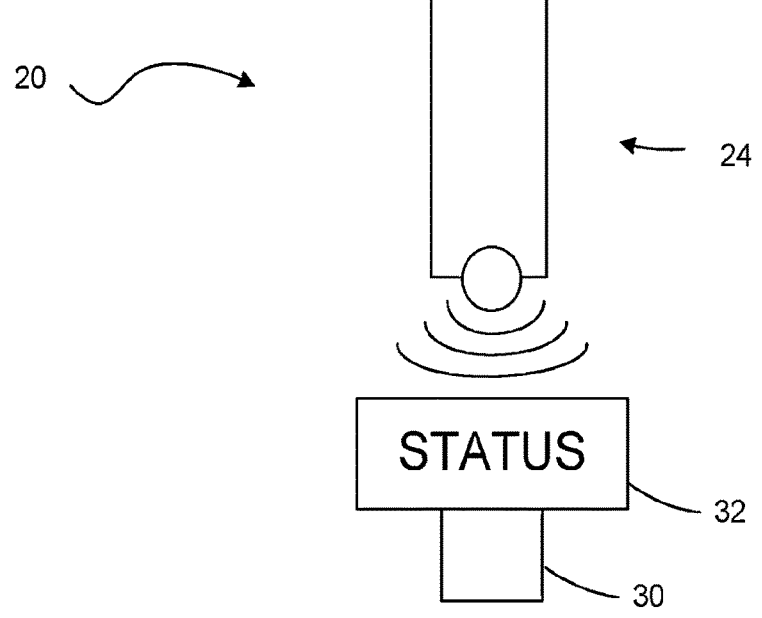
FIG. 4 is a schematic illustration of a detector module according to one embodiment.

With reference to FIGS. 3 and 4, exemplary embodiments of a detector module 20 are shown. The detector modules 20 as shown in FIGS. 3 and 4 are to be used in entrance systems, for instance, the entrance system 100 described with reference to FIG. 1 or 2.

In FIG. 3, the detector module 20 comprises an optical detector unit 22. Although not shown in the figure, the detector module 20 may alternatively comprise a plurality of optical detector units 22. The optical detector unit 22 may be any type of optical detector unit 22 being capable of optically detecting changes in status information. For instance, the optical detector unit 22 may be selected from a group comprising a charge-coupled device, CMOS sensor, angle-sensitive pixel, colorimeter, contact image sensor, electro-optical sensor, flame detector, infrared sensor, kinetic inductance sensor, LED as light sensor, light-addressable potentiometric sensor, Nichols radiometer, fiber optic sensor, optical position sensor, thermopile laser sensor, photo-detector such as MSN, photodiode such as P-N, P-I-N or avalanche, photomultiplier, photomultiplier tube, phototransistor such as NPN or PNP bipolar transistor or FET, photoelectric sensor, photoionization detector, photomultiplier, photoresistor, photoswitch, phototube, scintillometer, Shack-Hartmann wavefront sensor, single-photon avalanche diode, superconducting nanowire single-photon detector, transition-edge sensor, visible light photon counter, or wavefront sensor.

The optical detector unit 22 is arranged to detect at least one change in status information provided by a respective light-emitting unit 30. Accordingly, the optical detector unit 22 is compatible with the corresponding light-emitting unit 30 for detecting the at least one change in status information.

The optical detector unit 22 may be mounted to the respective light-emitting unit 30 by means of an adhesive material, e.g. tape, paste or glue for forming an adhesive bond between the optical detector unit 22 and the corresponding light-emitting unit 30. The optical detector unit 22 may be adapted to receive the light-emitting unit 30 at a receiving portion 27.

In alternative embodiments, the optical detector unit 22 may be arranged to a corresponding light-emitting unit 30 by means of any fastening means, such as screws, bolts, knobs, hooks, slots, pockets, spring units, or a pulley assembly, to name a few. Alternatively, the optical detector unit 22 may be mounted to a corresponding light-emitting unit 30 by means of magnetic or electric force, or any other type of similar coupling means.

The optical detector unit 22 may comprise a housing 26 adapted to house internal components of the optical detector unit 22. The housing 26 may be formed to receive at least a part of the light-emitting unit 30 through the receiving portion 27 of the optical detector unit 22. The housing 26 may comprise a light-emitting device 28. The light-emitting device 28 is indicative of said at least one change in status information provided by the respective light-emitting unit 30. Accordingly, even if the optical detector unit 22 is mounted on the light-emitting unit 30 such that light provided therefrom is concealed by the optical detector unit 22, the light-emitting device 28 of the housing 26 will still be able to show the light indicating the change in status information. This may be beneficial in situations where the change in status information has to be shown for e.g. a technician that is inspecting the detector module 20, but the information is also to be wirelessly communicated.

In one embodiment, the housing 26 comprises one or more openings or is constructed using an at least partly transparent material. For such housings 26, the light-emitting device 28 may not be required for visualizing the change in status information to the technician. Alternatively, the light-emitting unit may comprise a member capable of receiving fastening means and/or operate with coupling means, such as the ones previously mentioned.

In FIG. 4, the detector module 20 comprises a camera unit 24. Although not shown in the figure, the detector module 20 may alternatively comprise a plurality of camera units 24. The camera unit 24 may be any type of camera unit 24 being capable of optically detecting changes in status information when said changes are read from a display 32 associated with the one or more light-emitting units 30a-n. For instance, the camera unit 24 may be any type of image or video camera known in the art.

The camera unit 24 is configured to read status information of the display 32 associated with the one or more light-emitting units 30a-n The display 32 can be any type of display as previously described. In alternative embodiments, the one or more light-emitting units 30a-n may be embodied as the display 32.

In one embodiment, the light-emitting units 30a-n are capable of emitting light, for instance via the associated display 32, corresponding to an optically readable tag or code based on e.g. RFID, BLE, OR, NFC, to name a few. In these embodiments, the detector module 20 is adapted to interpret changes in status information based on the optically readable tag or code.

In one embodiment, the detector module 20 comprises a detector module processing unit (not shown) configured to process the status information read from the display 32. The detector module processing unit may be configured to implement one or more image processing algorithms known in the art, including but not limited to Naive Bayes algorithms, support vector machines, convolutional or recurrent neural networks, to name a few. The one or more image processing algorithms may be applied to the status information read from the display 32 such that the contents of the status information can be interpreted.

With reference to FIGS. 5 to 9, five different embodiments of a detector module 20 or a detector module system 200 comprising a plurality of detector modules 20a-n are shown, in which the inventive concepts disclosed herein may apply. These illustrations are merely to be interpreted as possible embodiments and are by no means to be construed as limiting to the scope of the present disclosure. Any number of detector modules 20a-n, optical detector units 22a-n, camera units 24a-n or light-emitting units 30a-n may be realized by the skilled person.

Figure 5:
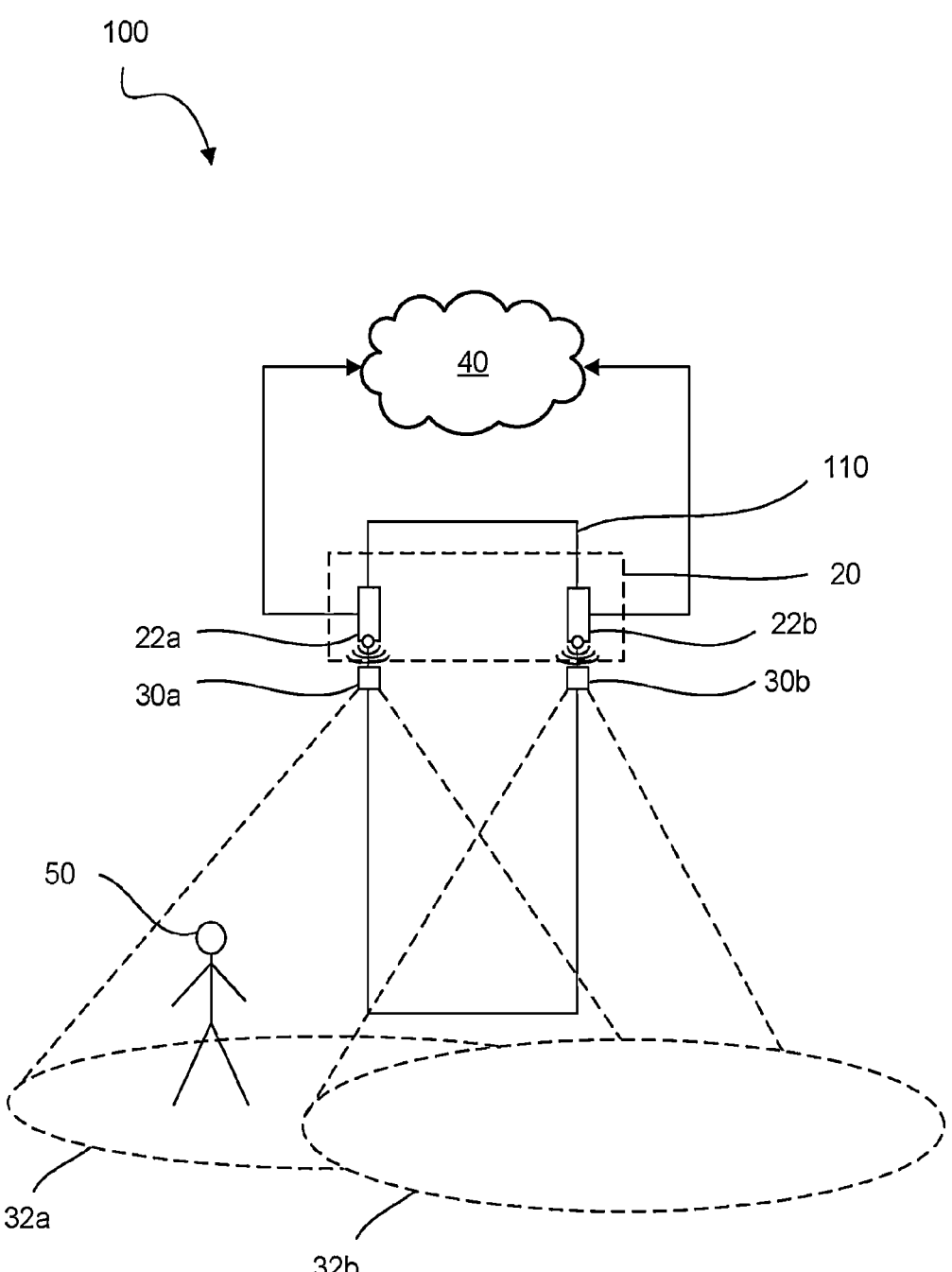
FIG. 5 illustrates an entrance system comprising a detector module and light-emitting units according to one embodiment.

FIG. 5 illustrates a detector module 20 for use in an entrance system 100. The detector module 20 comprises two optical detector units 22a-b, each being configured to detect changes in status information from a corresponding light-emitting unit 30a-b. The detector module 20 is arranged in the entrance system 100 at a movable door member 110. The light-emitting units 30a-b are configured to monitor a respective area 32a-b in the vicinity of the door member 110 or the entrance system 100. Upon an object 50, in this illustration being illustrated as a person 50, approaching a first area 32a, the corresponding light-emitting unit 30a is adapted to provide status information. The status information is in this example indicative of the person 50 approaching the door member 110 or entrance system 100. The corresponding optical detector unit 22a being configured to detect changes in status information will thus detect a new value in the status information provided by the light-emitting unit 30a. The change in status information will accordingly be transmitted to a remote server unit 40.

Figure 6:
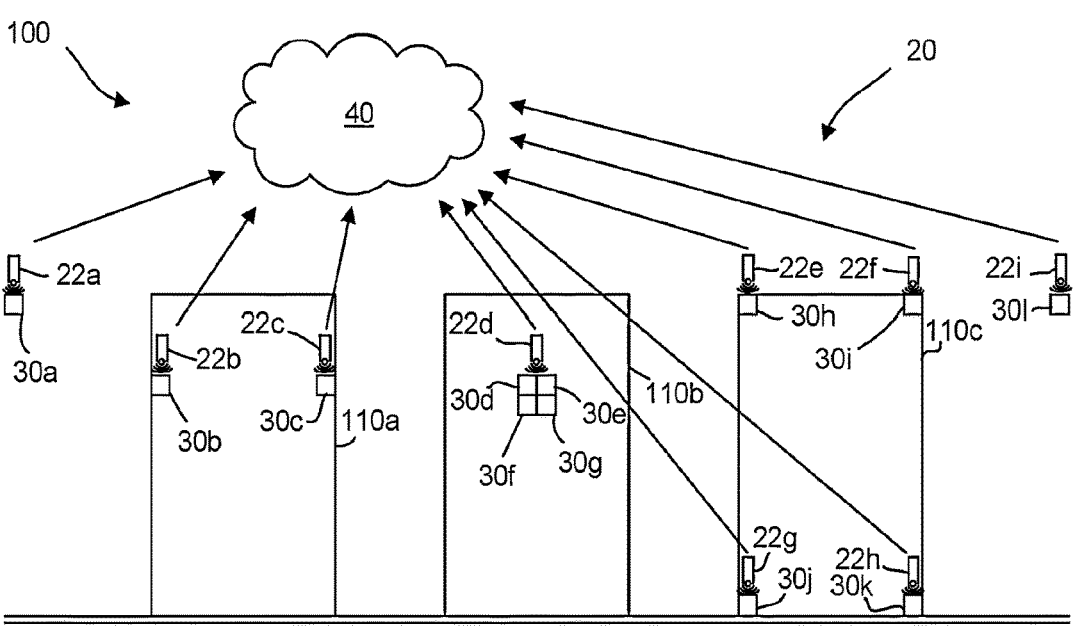
FIG. 6 illustrates an entrance system comprising a detector module and light-emitting units according to one embodiment.

FIG. 6 illustrates a detector module 20 for use in an entrance system 100. The detector module 20 comprises nine optical detector units 22a-i. The optical detector units 22*a-c* and 22*e-i* are each being configured to detect changes in status information from a corresponding light-emitting unit 30*a-c* and 30*h-1*. The optical detector unit 22*d* is configured to detect changes in status information from four light-emitting units 30*d-g* arranged generally adjacent to one another. The detector module 20 is arranged in the entrance system 100 at or near three movable door members 110*a-n*. The light-emitting units 30*a-l* may be configured to provide a variety of different status information as discussed previously. Upon some update in status information being provided by a light-emitting unit 30*a-1*, the corresponding optical detector unit 22*a-i* is configured to detect changes in status information and accordingly transmit said changes to a remote server unit 40.

Figure 7:
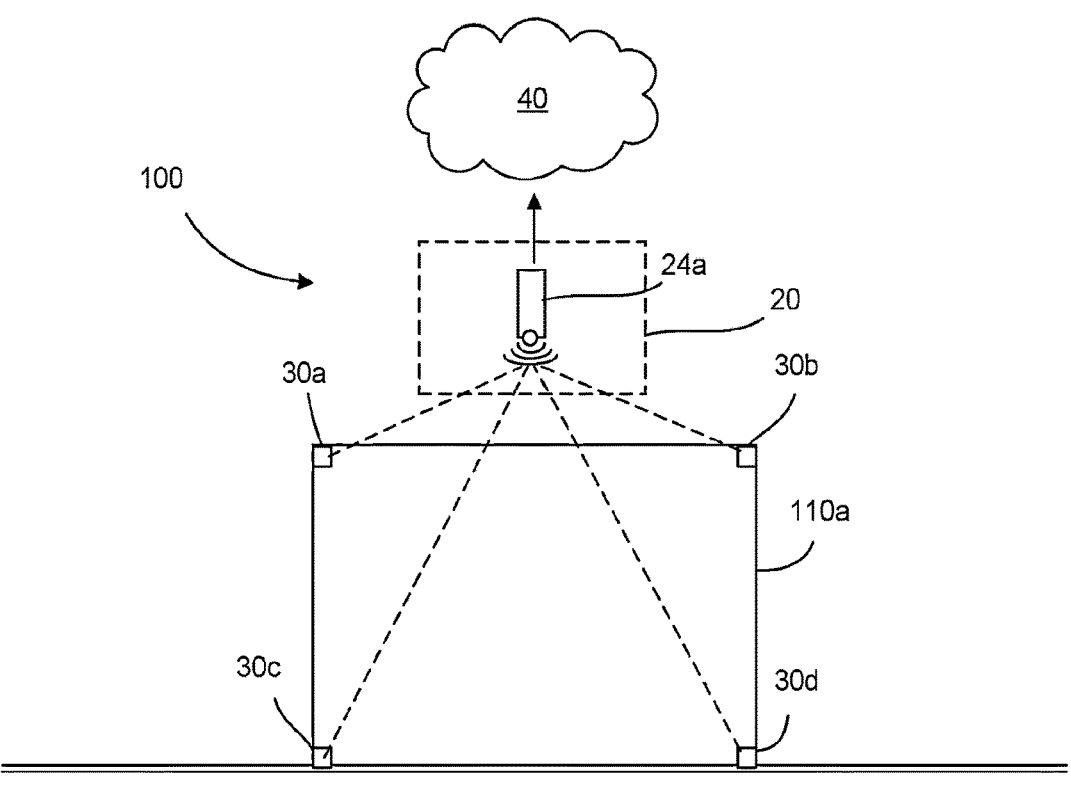
FIG. 7 illustrates an entrance system comprising a detector module and light-emitting units according to one embodiment.

FIG. 7 illustrates a detector module 20 for use in an entrance system 100. The detector module 20 comprises a camera unit 24*a*. The camera unit 24*a* is adapted to read status information from a display (not shown but previously described) from an associated light-emitting unit 30*a-d* arranged by a door member 110*a*. The read changes in status information are accordingly either processed in the detector module 20 and then transmitted to a remote server unit 40 or alternatively directly transmitted to the remote server unit 40.

Figure 8:
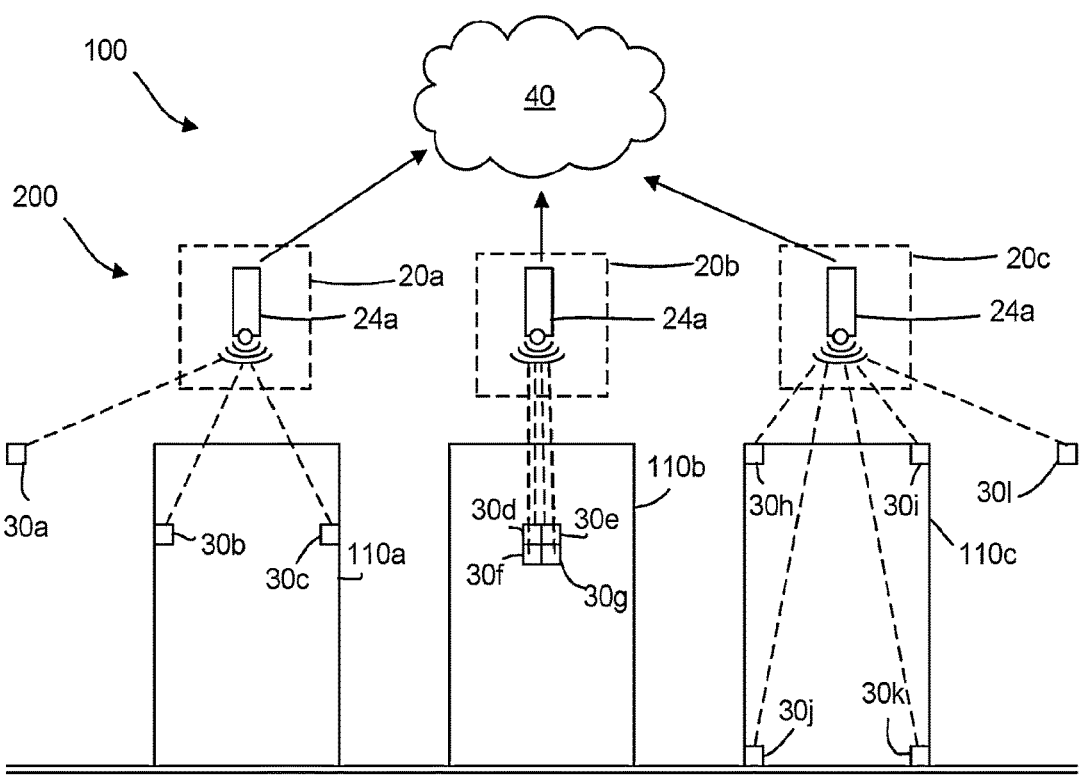
FIG. 8 illustrates an entrance system comprising a detector module system and light-emitting units according to one embodiment.

FIG. 8 illustrates a detector module system 200 for use in an entrance system 100 comprising three detector modules 20*a-c*. Each detector module 20*a-c* comprises a camera unit 24*a*. Similar to the embodiment as described with reference to FIG. 7, the camera units 24*a* are adapted to read status information from a display of a subset of the one or more light-emitting units 30*a-l*. In this example, the camera unit 24*a* of a first detector module 20*a* is adapted to read status information from a first subset of light-emitting units 30*a-c* associated with a first door member 110*a*. The camera unit 24*a* of a second detector module 20*b* is adapted to read status information from a second subset of light-emitting units 30*d-g* associated with a second door member 110*b*. The camera unit 24*a* of a third detector module 20*c* is adapted to read status information from a third subset of light-emitting units 30*h-1*. The detector modules 20*a-c* are independently of one another being configured to transmit the detected changes to a remote server unit 40.

Figure 9:
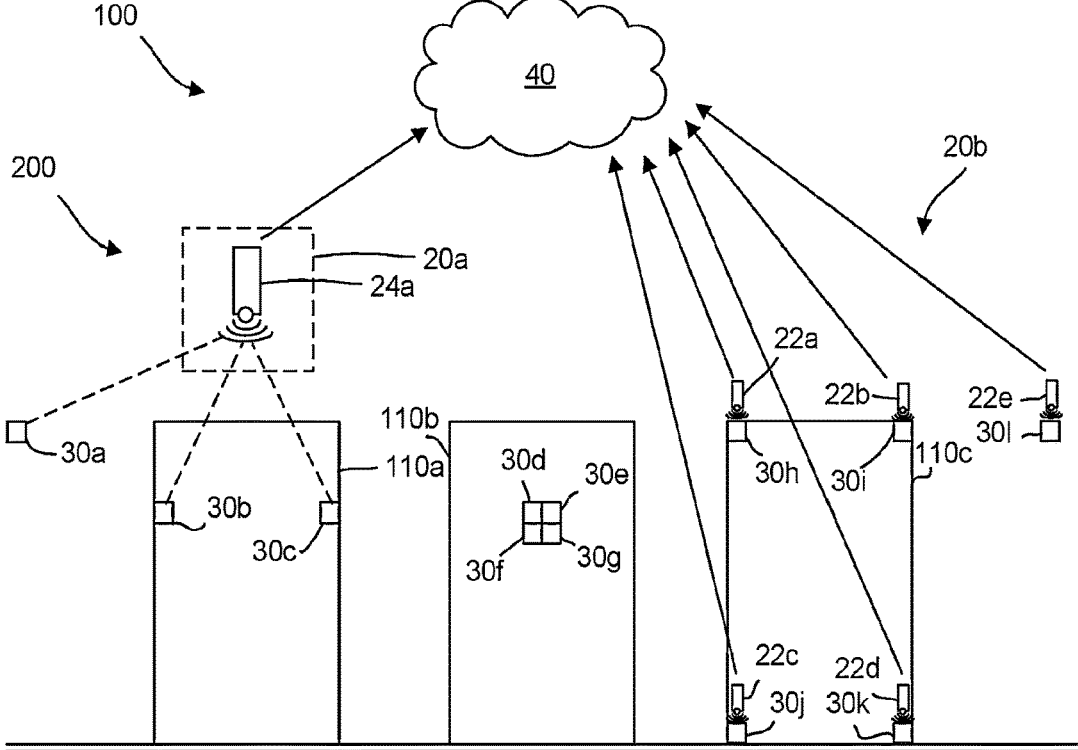
FIG. 9 illustrates an entrance system comprising a detector module system and light-emitting units according to one embodiment.

FIG. 9 illustrates a detector module system 200 being a combination of the embodiments described with reference to FIGS. 6 and 7, wherein the detector module system 200 is for use in an entrance system 100. The detector module system 200 comprises a first and a second detector module 20*a-b*. The first detector module 20*a* comprises a camera unit 24*a* adapted similarly to the camera unit 24*a* described with reference to FIG. 7. The second detector module 20*b* comprises five optical detector units 22*a-e* adapted similarly to the five optical detector units 22*e-i* described with reference to FIG. 6. Changes provided by the light-emitting units 30*e-g* arranged by the second door member 110*b* are not being detected in the exemplary illustration.

FIG. 10 shows an embodiment of a method 300 according to one embodiment. The method 300 comprises a step 310 of arranging a detector module 20 in an entrance system 100, the entrance system 100 comprising one or more light-emitting units 30*a-n* being configured to provide status information related to the entrance system 100. The method further comprises a step 320 of detecting, by the detector module 20, at least one change in said status information provided by the one or more light-emitting units 30*a-n*. In response to the at least one change being detected, the method 300 further comprises a step 330 of wirelessly communicating, by the detector module 20, said at least one change to a remote server unit 40.

In embodiments of the invention disclosed herein, a computer program product comprising computer code for performing the method 300 when the computer program code is executed by a processing device may be provided. The processing device may in preferred embodiments of the invention be the detector module control unit 201 as disclosed herein. Alternatively, the processing device may be provided separately and be implemented using any similar controller technology as described in association with the detector module control 201 unit and/or controller 120.

The invention has been described above in detail with reference to embodiments thereof. However, as is readily understood by those skilled in the art, other embodiments are equally possible within the scope of the present invention, as defined by the appended claims. It is recalled that the invention may generally be applied in or to an entrance system 100 having one or more movable door members not limited to any specific type.

The invention claimed is:

1. A detector module for use in an entrance system, the entrance system comprising one or more light-emitting units being configured to provide status information related to the entrance system,
   wherein the detector module is configured to:
   detect at least one change in said status information provided by the one or more light-emitting units, and
   in response to said at least one change being detected, wirelessly communicate said at least one change to a remote server unit.

2. The detector module according to claim 1, wherein the detector module comprises one or more optical detector units.

3. The detector module according to claim 2, wherein each optical detector unit is arranged to detect at least one change in status information provided by a respective light-emitting unit.

4. The detector module according to claim 2, wherein each optical detector unit is mounted to the respective light-emitting unit by means of an adhesive material.

5. The detector module according to claim 3, wherein each optical detector unit comprises a housing having a light-emitting device, wherein said light-emitting device is indicative of said at least one change in status information provided by the respective light-emitting unit.

6. The detector module according to claim 1, wherein the one or more light-emitting units comprise a display, wherein the detector module comprises a camera unit being configured to read status information from the display comprised of the one or more light-emitting units.

7. The detector module according to claim 6, wherein the detector module is configured to process the status information read from the display by applying one or more image processing algorithms.

8. The detector module according to claim 1, wherein said status information related to the entrance system is selected from a group comprising:
   presence detection status information,
   safety-related status information,
   door member status information,
   traffic status information,
   alarm status information,
   electrical component status information,
   timer status information,
   external condition status information, and
   error status information.

9. The detector module according to claim 1, wherein the remote server unit is an IoT cloud unit, and the detector module is configured to wirelessly communicate to the IoT cloud unit via one or more short-range or long-range communication interfaces.

10. The detector module according to claim 1, wherein said wirelessly communicated at least one change in status information is processed to control further operation of the entrance system and/or indicate a change in status information.

11. The detector module according to claim 1, wherein the detector module is adapted to be removably arranged in the entrance system.

12. An entrance system comprising:

one or more light-emitting units being configured to provide status information related to the entrance system, and a detector module being configured to:

detect at least one change in said status information provided by the one or more light-emitting units, and in response to said at least one change being detected, wirelessly communicate said at least one change to a remote server unit.

13. The entrance system according to claim 12, wherein the entrance system comprises one or more movable door members being sliding door members, revolving door members, swing door members, industrial vertical-lifting door members, overhead sectional door members, folding door members and/or any combination thereof.

14. A detector module system comprising a plurality of detector modules for use in the entrance system according to claim 12, wherein each detector module for use in the entrance system is configured to detect at least one change in status information provided by a subset of the one or more light-emitting units.

15. A method comprising:

arranging a detector module in an entrance system, the entrance system comprising one or more light-emitting units being configured to provide status information related to the entrance system;

detecting, by the detector module, at least one change in said status information provided by the one or more light-emitting units; and in response to said at least one changed being detected, wirelessly communicating, by the detector module, said at least one change to a remote server unit.

16. The detector module according to claim 1, wherein the detector module is adapted to be retrofitably arranged to any entrance system comprising one or more light emitting units.

* * * * *